(12) United States Patent
Robinson

(10) Patent No.: US 12,736,340 B2
(45) **Date of Patent: *Sep. 15, 2026**

(54) MULTIPLE ANGLE VERIFICATION MEASURING APPARATUS

(71) Applicant: Jonathan Duane Robinson, Hanover Park, IL (US)

(72) Inventor: Jonathan Duane Robinson, Hanover Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/350,463

(22) Filed: Oct. 6, 2025

(65) Prior Publication Data

US 2026/0185829 A1 Jul. 2, 2026

Related U.S. Application Data

(63) Continuation of application No. 19/002,954, filed on Dec. 27, 2024, now Pat. No. 12,435,976.

(51) Int. Cl.
*G01C 9/12* (2006.01)
*G01C 9/06* (2006.01)

(52) U.S. Cl.
CPC *G01C 9/12* (2013.01); *G01C 9/06* (2013.01)

(58) Field of Classification Search
CPC .................................... G01C 9/12; G01C 9/06
See application file for complete search history.

(56) References Cited

U.S. PATENT DOCUMENTS

| | | | |
|---|---|---|---|
| 6,176,020 B1 * | 1/2001 | Scarborough ............ | G01C 9/28 33/379 |
| 12,435,976 B2 * | 10/2025 | Robinson ................. | G01C 9/12 |
| 2003/0106227 A1 * | 6/2003 | Horburger ............... | G01C 9/26 33/365 |
| 2020/0132455 A1 * | 4/2020 | Sanders ................... | G01C 9/28 |

* cited by examiner

*Primary Examiner* — Kristina M Deherrera
*Assistant Examiner* — Tania Courson
(74) *Attorney, Agent, or Firm* — Cygan Law Offices PC; Joseph T. Cygan

(57) ABSTRACT

An angle measuring apparatus includes a housing that has a circular aperture, and a rectangular slot positioned such that a length of the slot is in parallel with the circular aperture. A rotating assembly has a needle pointer, positioned within the circular aperture and is operative to rotate, with the needle pointer maintaining a position with respect to the housing as the housing is moved angularly with respect to a reference position, such that the needle pointer indicates the direction of gravity. A transparent insert, that has indicia for indicating measurement angles, is operative to be removably inserted into the rectangular slot such that the indicia are superimposed over the rotating assemble and operative for use as reference indicia as the rotating assembly rotates.

17 Claims, 6 Drawing Sheets

MULTIPLE ANGLE VERIFICATION MEASURING APPARATUS

CROSS-REFERENCE TO RELATED APPLICATIONS

The present application is a Continuation of U.S. patent application Ser. No. 19/002,954, filed Dec. 27, 2024, entitled "MULTIPLE ANGLE VERIFICATION MEASURING APPARATUS," issuing as U.S. Pat. No. 12,435,976 on Oct. 7, 2025 and which is hereby incorporated by reference herein in its entirety.

FIELD OF THE DISCLOSURE

The present disclosure relates generally to level apparatuses such as bubble or spirit levels.

BACKGROUND

The spirit level, known as the bubble level, was invented about three-hundred and sixty years ago by a French scientist named Melchisedech Thevenot. With the present type of level, you could check your pool table to make sure that the balls don't roll on their own or make sure your floor is even. Another feature of the old spirit level is that there are usually one or more openings in the elongated rectangular prism housing where the liquid vials (bubble mechanisms) are placed.

There was one other bubble-type improvement over the old bubble-type vial. U.S. Pat. No. 7,513,055 B2 to Montgomery in 2009 still used the bubble, it could actually measure a few more degrees. But it was still a bubble level. It turned the bubble level into more of a measuring device. The original bubble level may be considered to be a verification instrument. It verified three distinct angles. What most people call level, some would call a 0-degree angle. The bubble level also verified two other angles. It verified the 90-degree angle, which is vertical or plumb, and it verified the 45-degree angle. Montgomery's invention measured a range of degrees more than it verified specific angles. But they all lack precision and the power of verifying numerous more specific commonly needed angles.

Regarding instruments that measured plumb, one that might be able to be miniaturized and fit inside the housing of a common-level type device is disclosed in U.S. Pat. No. 5,163,229 to Cantone, and could conceivably do a good job of pointing precisely at an angle straight down. It uses a pendulum pointing device, which means that gravity is its principal means of operation, instead of the floating of the liquid vial bubble between two lines. The most serious drawback of this device is that it does nothing else. However, a regular spirit level has a functional increase in usefulness compared to Cantone's device.

U.S. Pat. No. 7,392,593 B2 to Rivers et al. discloses graduated scales with a pendulum-type pointing device and two built-in liquid spirit levels. The built-in spirit levels could help to verify the accuracy of the pendulum pointing device. This made it a combination of a verification tool and a measuring tool. The Rivers device appears to only verify its own measurements. U.S. patent application publication 2008/0155844 A1 by Norvell, 2008 discloses a degree measuring tool or a tool to discover the specific angle of a surface.

A "plumber's level" is almost identical to the regular liquid vial level, however, instead of a bubble between two lines, there is a liquid vial with four lines, each line represented a slope somewhere between ⅛ of an inch per one-foot drop to find the slope, and up to one-half of an inch per one foot drop of a distance to measure the slope. U.S. patent application publication 2007/0246116 A1 by Peak, et al., 2007 discloses a device to measure the slope of a pipe. This device would not seem likely to fit inside a hole or holes in the side of an elongated rectangular prism-type housing. It is a combination of two small spirit-level liquid vials attached to a flat platform that could be seated on top of the pipe and was meant to be viewed from above. But, like the original spirit level, that would be its one and only function.

SUMMARY OF THE DISCLOSURE

My invention is in the field of technology of tools. It is one of the many types of hand tools. At first sight, it would be mistaken for a level because my invention could also be housed in an elongated rectangular prism-shaped body, similar to the common spirit level. The outward appearance would be very much like the U.S. Pat. No. 9,964,407 B2 to Captarencu et al. 2018. However, my disclosed apparatus increases the functionality of the old spirit level by 400%. The spirit level, known as the bubble level, was invented about 360 years ago by a French scientist named Melchisedech Thevenot. I hope that it lends to the unobviousness of my invention that no one has been able to make a 400% increase in its functionality in over 300 years. Replacing the not as accurate (bubble between two lines) level with focused pointed indicators might be a welcomed change.

More broadly, the present type of level might be seen in the future as sort of a one-trick pony. You could check your pool table to make sure that the balls don't roll on their own or make sure your floor is even. Another feature of the old spirit level is that there are usually one or more openings in the elongated rectangular prism housing where the liquid vials (bubble mechanisms) are placed. There was one other bubble-type improvement over the old bubble-type vial. U.S. Pat. No. 7,513,055 B2 to Montgomery in 2009 still used the bubble, it could actually measure a few more degrees. But it was still a bubble level. It turned the bubble level into more of a measuring device. I consider the original bubble level a verification instrument. It verified three distinct angles. What most people call level, some would call a 0-degree angle. The bubble level also verified two other angles. It verified the 90-degree angle, which is vertical or plumb, and it verified the 45-degree angle. Montgomery's invention measured a range of degrees more than it verified specific angles. But it was indeed a spirit level on steroids. But they all lack the precision of my invention and the power of verifying numerous more specific commonly needed angles.

In my search to find an instrument that measured plumb, I only found one that might be able to be miniaturized and fit inside the housing of a common-level type device. The U.S. Pat. No. 5,163,229 to Cantone in 1992 could conceivably do a good job of pointing precisely at an angle straight down. It also, like mine, used a pendulum pointing device, which means that gravity was its principal means of motivation Instead of the floating of the liquid vial bubble between two lines. The most serious drawback of this device Is that it did nothing else. It was the real one-trick pony. Even the regular spirit level had a functional increase in usefulness compared to Cantone's. Building Cantone's invention into the housing of a regular elongated rectangular prism-type level instrument would probably require a spherical-shaped see-through window to view the measuring device.

I also found other measuring-type devices that could be built into a level-type housing with incremented graduating scales. The U.S. Pat. No. 7,392,593 B2 to Rivers and Diggle 2008 had graduated scales with a pendulum-type pointing device and two built-in liquid spirit levels. The built-in spirit levels could help to verify the accuracy of the pendulum pointing device. This made it a combination of a verification tool and a measuring tool. The major difference between this one and mine is that mine verifies a specific group of angles that have been predetermined to be useful if you are a carpenter, a contractor, or a code inspector. The one patented by Rivers and Diggle Only seems to verify its own measurements. Mine also verifies its own measurements along with verifying some commonly needed measurements without having to look up the actual angles. One of the background features of my invention is a regular angle-measuring device. But I don't believe that measuring for specific angles is needed as much as verifying some commonly occurring angles in the process of building or rehabbing or checking carpentry and other building works.

There is one other invention that could almost be the sister or brother to the before mentioned tool. The U.S. patent 2008/0155844 A1 to Norvell, 2008.This is also the one that most closely resembles the construction of my invention. There are some striking similarities, in principle, between the physical construction of the mine and Norvell's, except for the fact that his is also strictly a degree measuring tool or a tool to discover the specific angle of a surface. What I mean when I say that it is only a measuring device is this. When someone uses The Multiple New Angles Verification Measuring Apparatus (my invention), a supposed angle is already known. You are not trying to make the angle; you are checking to make sure that the angle is true. With mine, the graduated scale is built into my indicators, and like the bubble level, a graduated scale is not needed to verify surfaces or angle's correctness. As you will see later, the graduated scale or bubble will not help you do some of what mine is built to do. I believe that mine is a true replacement for the old spirit level because mine also uses symbolic measures instead of numbers, just as the bubble between two lines does. The person using my tool will look for the alignment of two points instead of the actual degrees. Also, as you will see later, mine is also sometimes a visual representation of a range of angles or an angle specific to a certain job.

The next nearest thing I could find in my searches for relevant material was one invention being used to measure the drainage slope of a pipe. One of the functions of my invention is that it can readily identify whether the slope of a drain pipe is appropriate without looking for an angle or having to calculate the angle using the length of the pipe and the distance of the rise or fall of the pipe. While doing my search for something similar I found a tool called a plumber's level. I went to search the patents and couldn't find a plumber's level at all. However, the plumber's level is almost identical to the regular liquid vial level. Instead of a bubble between two lines, there was a liquid vial with four lines, each line represented a slope somewhere between ⅛ of an inch per one-foot drop to find the slope, and up to one-half of an inch per one foot drop of a distance to measure the slope. It may have been considered to be too much of a natural progression from the regular liquid vial (spirit) level to attain a patent. However, the nearest patent that I found that was created to measure the slope of a pipe was the U.S. patent 2007/0246116 A1 to Peak, Branscomb, Hopkins, and Bowden, 2007. But unlike the other levels and my own, this device would not seem likely to fit inside a hole or holes in the side of an elongated rectangular prism-type housing. It was a combination of two small spirit-level liquid vials attached to a flat platform that could be seated on top of the pipe and was meant to be viewed from above. But, like the original spirit level, that would be its one and only function.

My invention gets rid of the bubble liquid vial mechanism with the bubble between two lines and replaces it with a new multi directional type of pendulum device(s). This means mine points in more directions than down and measures in a different way. It is more accurate because you have to align two arrowheads or pointers towards each other. The arrowhead/pointer may also be pointed toward a range of predetermined degrees. You can know the pitch of a roof by laying my invention flat on the roof, and one of the arrowheads will point to a line indicating whether the roof has a 4/12 pitch, a 6/12 pitch, or a 8/12 pitch (that's one advantage). If you lay this new device on a pipe, a pointer or arrowhead will point between a range between a ¼ inch per foot slope and a ½ inch per foot slope, indicating that the slope would be correct for proper drainage (that's two advantages). If you lay the device on some residential stairs, the arrowhead or pointer would land between a predetermined range of degree symbols that indicate whether the stairwell steepness is within the OSHA federal standard guidelines for safety (that's three). That would be a 300% increase in functionality from the old spirit level. But it can also show you whether a surface is plumb (0 degrees), Vertical (90 degrees), or diagonal (45 degrees), like the old spirit level. It is also capable of giving you graduated scale measurements of any degree between zero degrees and 180 degrees (that makes it 400%). If installed in more than one of the openings in the elongated rectangular prism shaped housing, it can be used to verify not only the before mentioned slopes and pitches but also each other. What I'm saying here is that if more than one of them agrees with each other, you can be more certain of its accuracy. It can also be designed to be capable of verifying any predetermined angles. There would be no math necessary to verify some slopes and angles. For all practical purposes, common angles that need to be identified quickly would be immediately identifiable, including recognizing plumb, vertical, and diagonal.

BRIEF DESCRIPTION OF THE DRAWINGS

FIG. 2 consists of FIG. 2A, FIG. 2B, and FIG. 2C and shows five of the parts that are positioned within the housing (shown in FIG. 1) and placed inside one or more of the openings of the housing.

FIG. 2A shows a bearing.

FIG. 2B shows a rear view of a multi-directional pointing disc in accordance with various embodiments.

FIG. 2C is an assembly exploded view drawing showing various parts of the disclosed apparatus including an outer lens cap 20, the bearing 26 (as shown in FIG. 2A), the multi-directional pointing disc 28 (as shown in FIG. 2B) and an inner lens cap 22.

DETAILED DESCRIPTION

Figure 1:
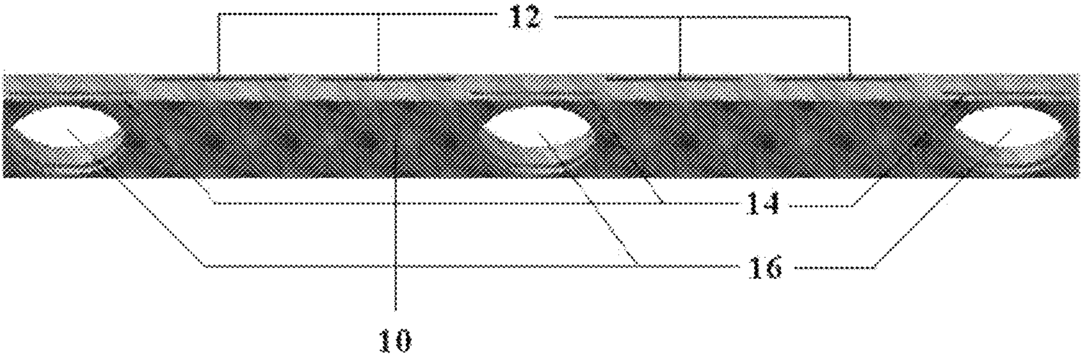
FIG. 1 shows a housing for an apparatus of the present disclosure, in accordance with some embodiments. The housing may also be referred to as an elongated rectangular prism. It will have one or more openings to hold the parts that do the verifying or measuring.

In one disclosed embodiment, there are eight parts.

Figures 2A, 2B, 2C:
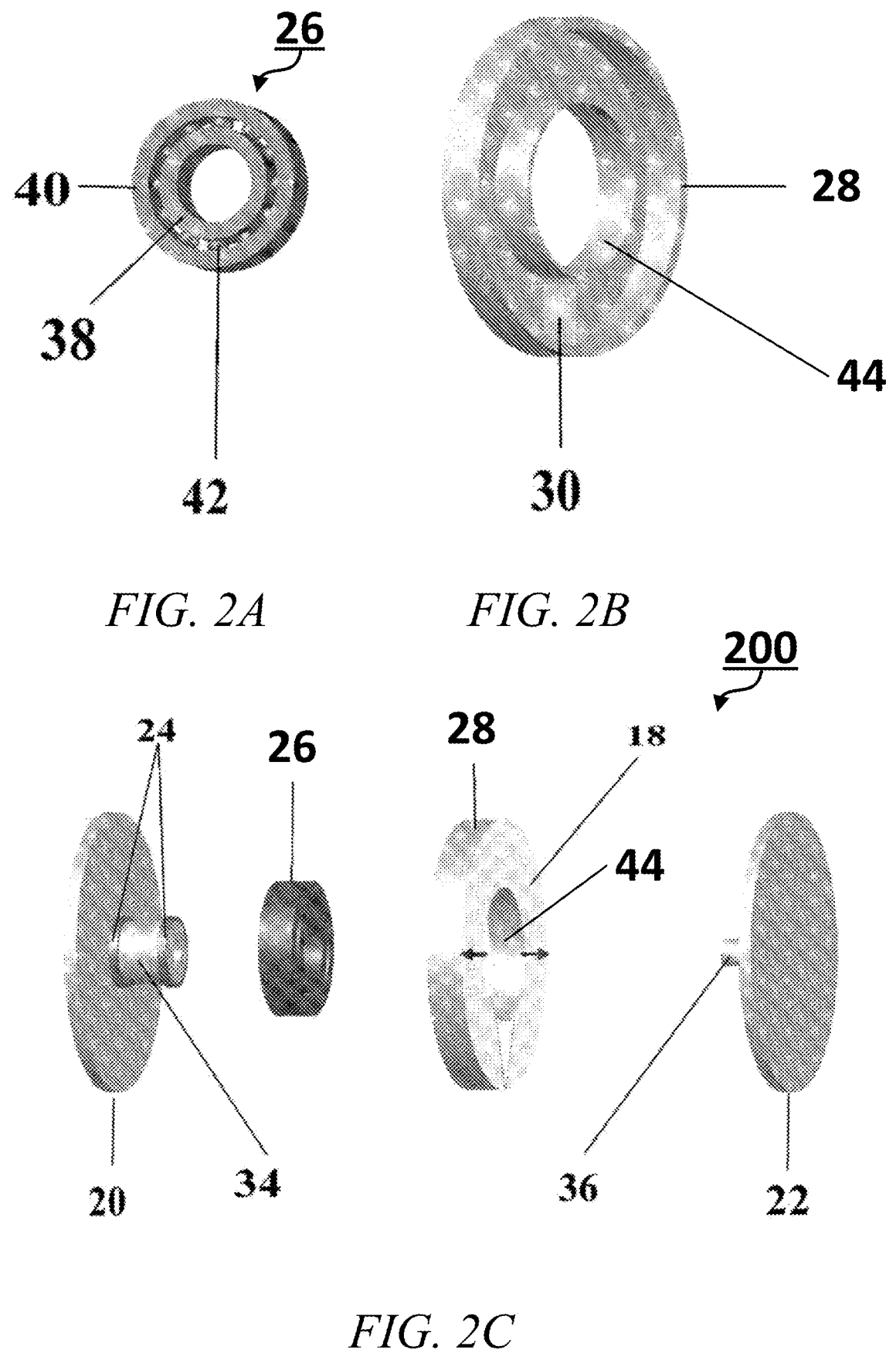

FIG. 2A shows the pieces of a bearing 26 which has an outer bearing ring 40, an inner bearing ring 38 and some ball bearings 42 sandwiched between the outer bearing ring 40 and the inner bearing ring 38.

FIG. 2B shows a multi-directional pointing disc 28 which includes a weight 30, and has an inner aperture 44 which has an inner diameter. As shown in FIG. 2B, the multi-directional pointing disc 28, is hollow inside and the weight 30 is secured behind a downward pointing indicator on the pendulum ring decal 18, which is placed on the outside surface (front surface) of the multi-directional pointing disc 28.

FIG. 2C is an assembly 200 exploded view drawing showing various parts of the disclosed apparatus including an outer lens cap 20, the bearing 26 (as shown in FIG. 2A), the multi-directional pointing disc 28 (as shown in FIG. 2B), which has an affixed pendulum ring decal 18, and an inner lens cap 22. The assembly shown in FIG. 2C includes two transparent interlocking lens caps; outer lens cap 20, and inner lens cap 22, which are flat transparent circular plates with interlocking axle hubs. The outer lens cap 20 includes outer axle hub 34 which is a hollow pipe like cylinder, and inner lens cap 22 includes inner axle hub 36 which is insertable into outer axle hub 36 via a male-female type connection.

The bearing 26 fits between the two spacers 24, and around the outer axle hub 34. The multi-directional pointing disc 28, inner aperture 44, goes around the bearing 26 such that the bearing 26 and multi-directional pointing disc 28 fit between the transparent outer lens cap 20 and the transparent inner lens cap 22. The outer edges of the lens caps are attached to the housing 10, and within one of the openings 16, and may be secured by glue in some embodiments.

When viewing the apparatus and looking into one of the windows formed by either inner lens cap 22 or outer lens cap 30, the multi-directional pointing disc 28 is visible. If viewed through the inner lens cap 22, the pendulum ring decal 18 (which is affixed to the surface of multi-directional pointing disc 28) is visible because the pendulum ring decal 18 is always on the side of the multi-directional pointing disc 28 facing the inner surface of the transparent lens caps 22. Because the multi-directional pointing disc 28 is fitted on the outside around the outer bearing ring 40 of bearing 26, the multi-directional pointing disc 28 can revolve around the inside parts of the bearing 26, and the weight 30 inside the multi-directional pointing disc 28 assures that the downward pointing indicator on the pendulum ring decal 18 is always pointing downward. Therefore, no matter at what angle you hold the housing 10 (i.e. angle or tile the housing 10 with respect to the ground), a triangular downward pointing indicator on the pendulum ring decal 18 will be pointing downward. Additionally, two side arrows 49 on the pendulum ring decal 18 will always indicate level or 0 degrees.

Figures 3A, 3B:
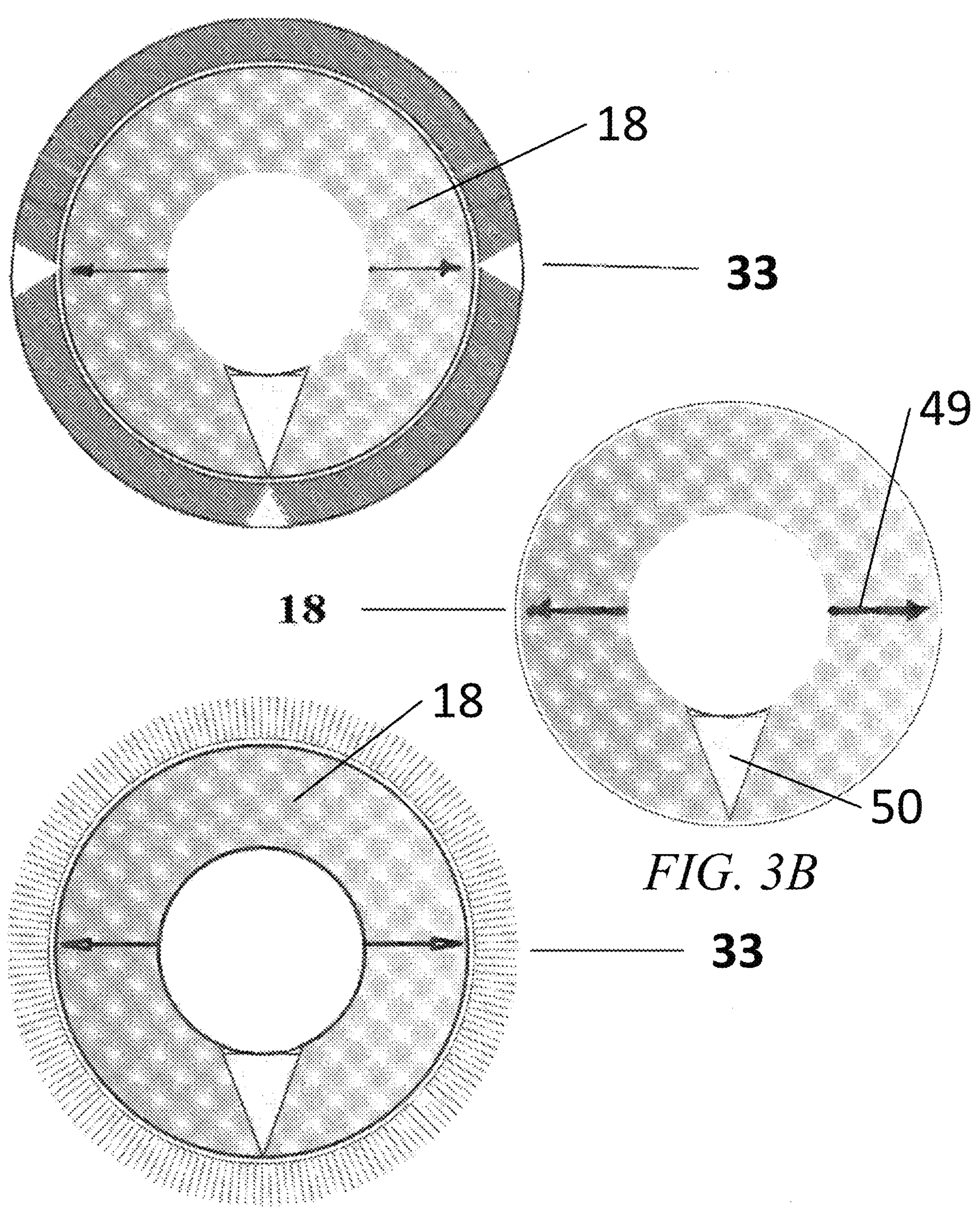
FIG. 3A shows two different example types of decals which are outer ring decals as they surround a pendulum decal which is shown internal to the outer ring decals.
FIG. 3B shows the pendulum ring decal without an outer ring decal. The pendulum ring decal outer diameter fits within the inner diameter circle formed by the outer ring decals such that the outer ring decals surround, and can be superimposed over, the pendulum ring decal.

FIG. 3A shows two example outer ring decals 33. The outer ring decals 33 are affixed to transparent inserts 32 which may be stored in holsters 12 shown in FIG. 1 which are positioned within the top of the housing 10. FIG. 3B shows an example pendulum ring decal 18 which includes two side arrows 49 to indicated level or zero degrees, and a triangular downward pointing indicator 50.

Figures 4A, 4B:
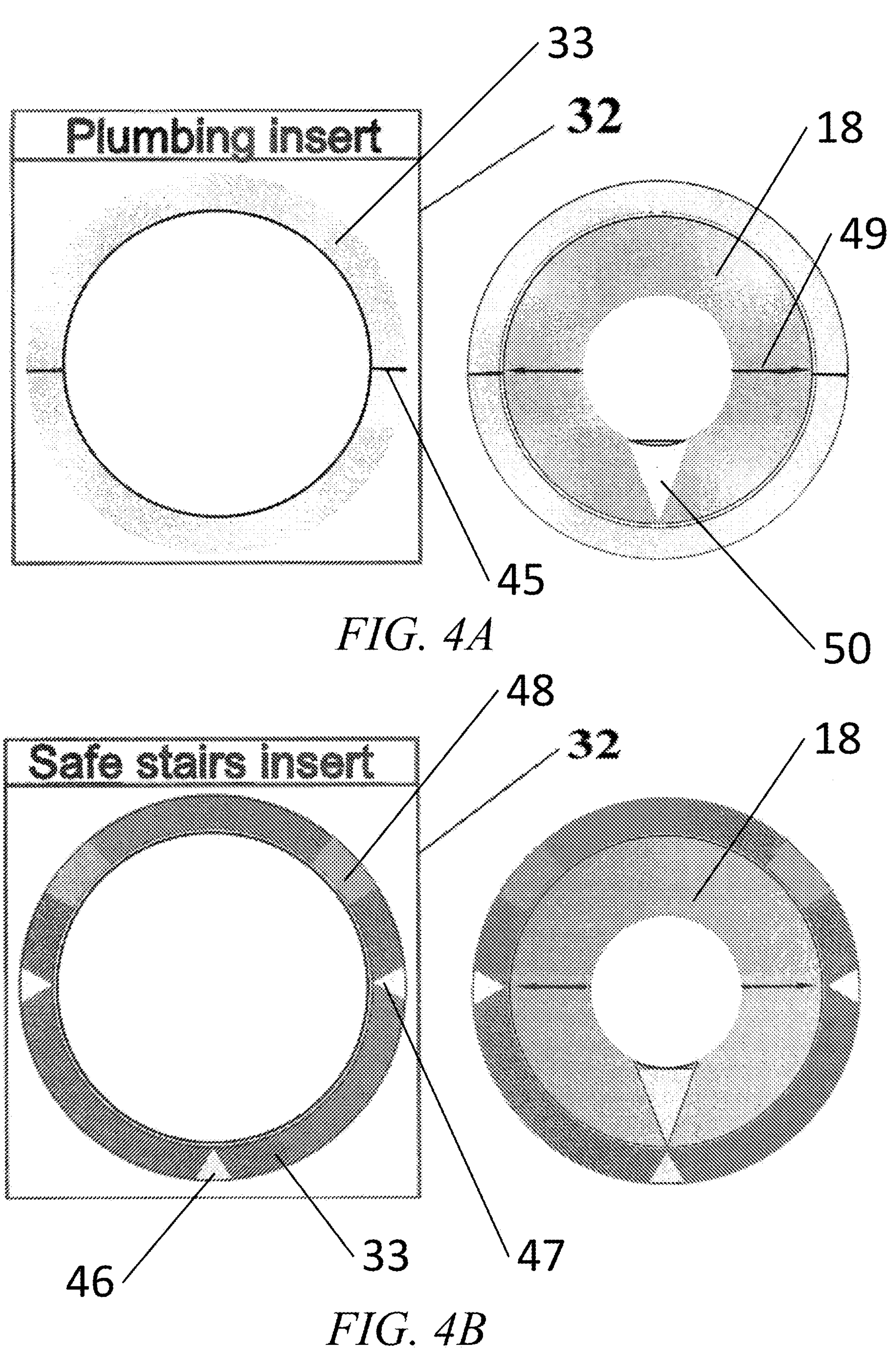
FIG. 4A shows an example type of precalculated angle or measuring insert in accordance with an embodiment. The outer ring decals shown in FIG. 3A and FIG. 3B may be affixed to the insert to be superimposed over the pendulum ring decal when place in the housing shown in FIG. 1.
FIG. 4B is another example insert in accordance with an embodiment.

FIG. 4A shows an example plumbing insert 32 having an example outer ring decal 33 which can surround a pendulum ring decal 18 and has side level lines 45 to align with the pendulum ring decal 18 two side arrows 49 to indicate level. FIG. 4B shows an example staircase insert having 45 degree indicators 48, level arrows 47 and a bottom indicator 46.

In the example housing 10 shown in FIG. 1 there are four holsters 12 operative to store inserts 32, such as shown in FIG. 4A and FIG. 4B, when the inserts 32 are not in use. In a further example, one of the inserts may be for verifying the most common roof-top pitches, one may be for checking for the proper drainage slope of a drainpipe, one may be for making sure a set of stairs are not too steep according to OSHA standards, and one may be for measuring degrees of inclined surfaces, or the like, etc. The example housing 10 also has three overlay slots 14. These overlay slots 14 are where the inserts having the outer ring decals 32 are inserted while covering the opening areas to make a verification such that the outer ring decals 32 surround the pendulum ring decal 18 when viewed through the inner lens cap 22.

Figures 5A, 5B:
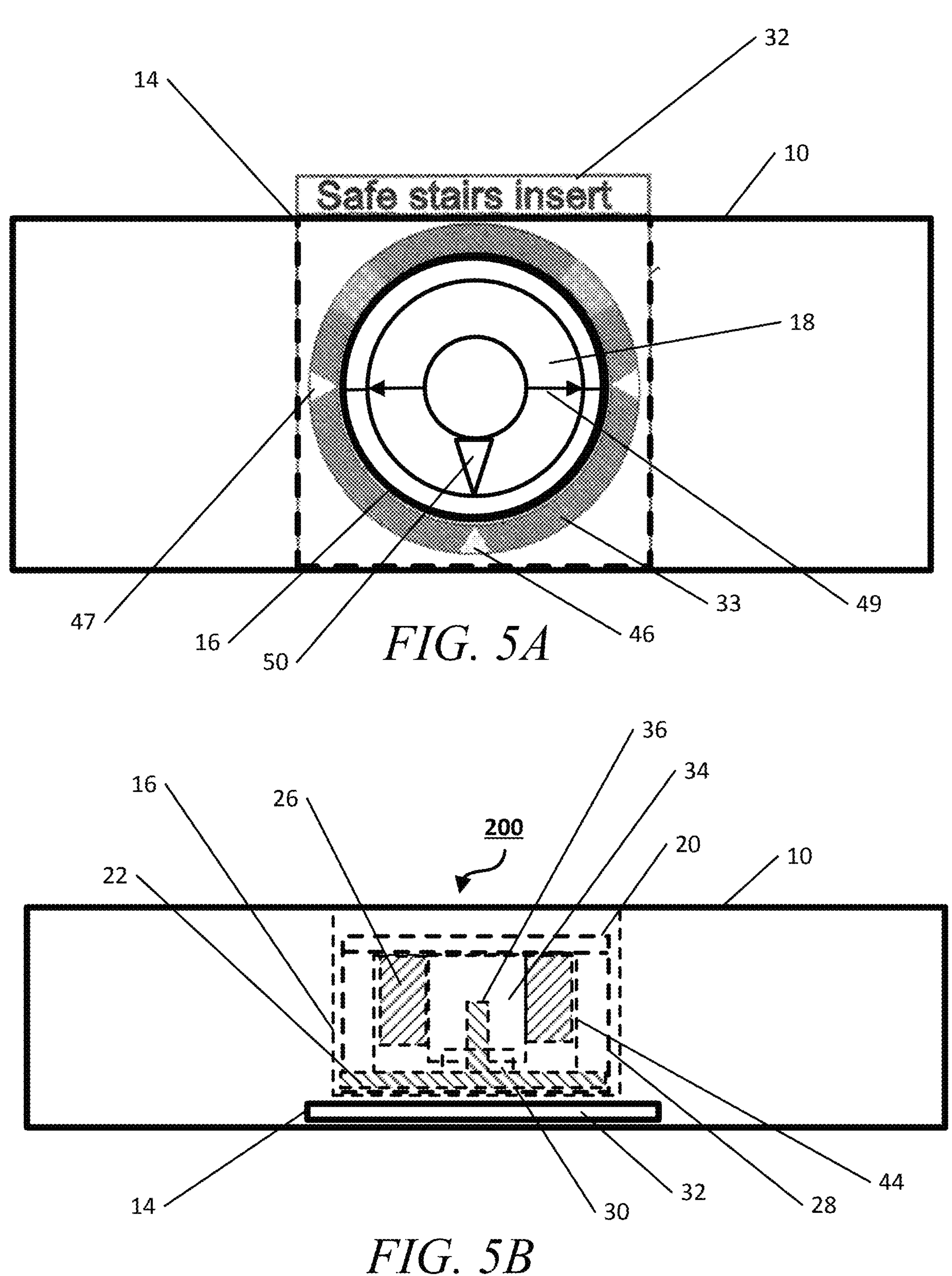
FIG. 5A shows an insert as shown in FIG. 4B, placed within the housing as shown in FIG. 1, along with the assembled parts shown in the exploded view of FIG. 2C.
FIG. 5B is a top, cross-sectional view of the housing shown in FIG. 5B showing the internal parts.

FIG. 5A shows a front view of an assembled apparatus in accordance with an embodiment and having an example insert 32 from the example shown in FIG. 4B. The apparatus is shown in a level position such that the side arrows 49 of multi-directional pointing disc 28 are aligned with level arrows 47, and the triangular downward pointing indicator 50 is aligned with bottom indicator 46 on the outer ring decal 33 of the insert 32. The insert 32 is positioned within an overlay slot 14 of the housing 10 and the assembly 200 is positioned within opening 16 of the housing 10.

FIG. 5B shows a top, cross-sectional view of the housing 10 shown in FIG. 5B and shows the internal parts of the assembly 200. The insert 32 is positioned in an overlay slot 14 which places it in front of the assembly 200 such that its outer ring decal 32 is superimposed over the multi-directional point disc 28, and the pendulum ring decal 18 as shown in FIG. 5A. The weight 30 is positioned at the bottom of the multi-directional pointing disc 28 and is aligned with the downward pointing indicator 50 such that, when a lengthwise centerline of the apparatus either substantially parallel to the ground or at an angle to the ground, the weight will be at the bottom due to gravity and the downward pointing indicator 50 will be pointed downward.

The inner lens cap 22 is shown positioned such that its inner axle hub 36 is inserted into the outer axle hub 34 of the outer lens cap 20. The outer axle hub 34 is inserted into the inner bearing ring 38 of the bearing 26, and the bearing 26 is fitted within the inner aperture 44 of the multi-directional pointing disc 28. The assembly 200 is positioned within an opening 16 of the housing 10.

Operation

One example user of the disclosed apparatus may be a code inspector. Let's say you are a code inspector, and someone has put in a new stairway without your knowledge and someone else has fallen down the stairs and they are saying that it was because the stairs are too steep. This is what the code inspector will have to do. He takes the insert 32 having the appropriate outer ring decal 33 (for checking stairs) out of their appropriate holster 12 and positions the insert 32 into the overlay slot 14. He could use just one if he likes, but when using all three, they (each outer ring decal 33) can also verify each other's measurements for more accuracy. Then, if he is holding the device level he will see the outer ring decal 33 superimposed over and around the pendulum ring decal 18. Once the inspector lays the instrument down on the stairs, the outer ring decal 33 will tilt with the housing 10, but the pendulum ring decal 18 will still be pointing down. When one of the side arrows on the pendulum ring decal falls within one of the two upper lighter shaded areas on the outer ring decal, it will indicate that the stairs are built at a safe angle according to OSHA guidelines. The reason for the two lighter shaded areas is so the verification can be done whether the stairs incline up to the left or up to the right.

First Alternative Embodiment

In this alternative embodiment, there are no interchangeable outer ring decals and there are no outer ring decal parts at all. For this embodiment, all the angle measuring symbols are installed permanently at the opening 16 sights. There is no need for holsters 12 or overlay slots 14. You can verify all four of the things the original embodiment does with what is permanently installed in the housing 10 openings 16. In some embodiments, the measuring window is about 2 inches in diameter, and putting all of the information for all four decals inside that tiny viewing area would make it very cluttered and confusing. Therefore, in this embodiment, the housing 10 may be increased in size such that the opening 16 is larger to accommodate a larger viewing window so that the information is not cluttered.

Second Alternative Embodiment

In this embodiment, the openings 16 at the ends of the housing would be closer to the middle of the housing 10, and spaced the same distances away from each other. In one example, each opening may be eight inches apart, with three openings total. In a further example, the housing 10 may be four inches high, about 3 feet long, and about one inch wide. The example embodiment may also include, a transparent sheet of glass or an acrylic sheet, positioned flush against the side of the housing 10 and permanently affixed to it. In another example, the sheet may be four inches wide and may slide back and forth along the length of the housing 10. The sheet may cover all three openings 16 and all the parts that are inside. The images of the four different outer ring decals 33 are on this transparent sliding sheet that is attached to the housing 10. They are also spaced eight inches apart so that when you slide the sheet back and forth along the housing 10, the four sets of outer ring decals, will be superimposed over and around the matching pendulum ring decals 18. This will have the same effect as placing the outer ring decals 33 inside the overlay slots 14 via the inserts 32, because all four of the outer ring decals 33 would be put on the sliding mechanism and you would simply have to slide the appropriate outer ring decals over to the pendulum ring decal in the housing before making the verification.

Figure 6:
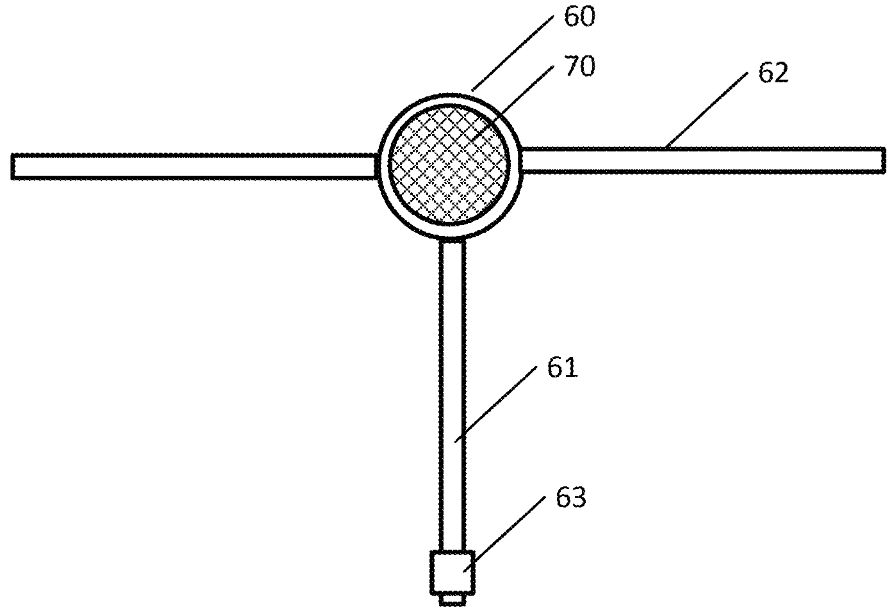
FIG. 6 is an alternative embodiment using a needle as the downward pointing mechanism.

In another example embodiment shown in FIG. 6, the bearing 26 and the multi-directional pointing disc 28 are eliminated and the outer axle hub 34 and inner axle hubs 36 are replaced by a very small diameter cylinder 70 positioned in the center, and connecting the outer lens caps 20 to the inner lens cap 22. The multi-directional pointing disc 28 and the pendulum ring decal 18 are replaced by a needle 60 hanging down from the new small diameter cylinder that bridges between the outer lens cap 20 and the inner lens cap 22. The needle 60 hangs down from the new small diameter cylinder to form the downward-pointing device. In order to make the needle multi-directional, a bar 62 approximately the same size as the shaft of the downward pointing needle segment 61 is positioned across the top of the needle through the eye (but not blocking it), making it look like a capital T. The ends of the bar 62 would be the other two pointers.

So, there would be three pointers, all the same length, coming from the eye of the needle 60. They would all be the same length, except that the downward pointing needle segment 61 would be much heavier than the other two because it would include the new weight 63. This and gravity would keep it pointing downward. There would have to be some modified spacers to keep it from rubbing against the inside of the lens caps 20 and 22. But this could work much like the original multi-directional pointing disc 28.

Advantages

There are five advantages to the disclosed apparatus. The spirit level gives a close verification of how horizontal, vertical, or diagonal a surface or object is. The bubble between two lines has a particular usefulness. But the embodiments of the disclosed apparatus gives a more precise readout. It gives a pointer-to-pointer readout that aligns the tips of pointers to measure and verify angles. However, the spirit level has not changed in any significant way in 300 years. Up until now it has been sort of a one-trick pony. It verifies horizontal, vertical, and diagonal (45 degrees) angles. So, the first advantage is a more precise measurement. Then, the disclosed apparatus also increases the functionality of the old spirit level by 400%, and here's how. For plumbers, this tool verifies the slope angle of a drain pipe. You no longer have to create a level line over the pipe and measure a distance out and a distance down to get a ratio from those numbers to verify the angle or have to purchase separate plumber's bubble level. You just place this new device on the pipe, and it has a predetermined angle line on the appropriate outer ring decal 33 that will align with one of the side arrows on the pendulum ring decal 18 if the slope of the pipe is correct. The third advantage and new function is that it verifies the three most common roof pitches. There are many reasons why a contractor or a code inspector may need to know the pitch of a roof, but as of now, they must get up to the roof, and then they put one end of the level on the roof while they hold the rest of the level out horizontally from the slope of the roof. Then they measure a distance out from where the level touches the roof and measure a distance down to the roof from the elevated end of the level. Then they make a calculation with those numbers that will give them the pitch of the roof. Most of that is unnecessary with the disclosed apparatus. You just lay the disclosed apparatus flat against the roof straight down the slope of the roof and see which of the precalculated roof pitch angle lines on the appropriate outer ring decal 33 match up to one of the side arrow pointers on the pendulum ring decal 18. There could be decals for all standard roof pitches. There are three additional advantages. There are no more mistakes due to miscalculations. It becomes much easier to train an employee to do that job, and you need fewer tools to accomplish the task.

Conclusion, Ramification, and Scope

Thus, the reader can see that it has been a long time coming for an upgrade for the old bubble level, and now there is something that adds so much to it that it is no longer just one tool. The disclosed embodiments are not limited to the example outer ring decals 33 disclosed and additional outer ring decals 33 may be added in accordance with the various embodiments.

Over time, this instrument will be able to streamline specific tasks. It will also be able to streamline the training of employees in doing these particular tasks relevant to this tool. It will eliminate the need to calculate some measurements that were necessary before. It is a tool that will make some jobs quicker and easier.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. An angle measuring apparatus comprising:

a housing comprising a circular aperture, and a rectangular slot positioned such that a length of the slot is in parallel with the circular aperture;

a rotating assembly comprising a needle pointer, positioned within the circular aperture and operative to rotate, with the needle pointer maintaining a position with respect to the housing as the housing is moved angularly with respect to a reference position, such that the needle pointer position indicates the direction of gravity; and a transparent insert, comprising indicia for indicating measurement angles, the transparent insert operative to be removably inserted into the rectangular slot such that the indicia are superimposed over the rotating assembly and operative for use as reference indicia as the needle pointer rotates.

2. The angle measuring apparatus of claim 1, wherein the transparent insert is rectangular.

3. The angle measuring apparatus of claim 1, further comprising:

a plurality of transparent inserts, each transparent insert removably insertable into the rectangular slot, and comprising a unique indicia operative for a different measurement purpose using the rotating assembly.

4. The angle measuring apparatus of claim 3, wherein the housing further comprises:

a plurality of storage slots corresponding to the plurality of transparent inserts, each storage slot operative to store a transparent insert removably insertable therein.

5. The angle measuring apparatus of claim 1, further comprising:

a transparent cap, covering the circular aperture of the housing, and coupled to the rotating assembly.

6. The angle measuring apparatus of claim 5, further comprising:

the transparent cap, comprising a protruding inner axle hub; and an end cap, comprising a protruding outer axle hub having an inner aperture, operative to have the inner axle hub inserted to form a portion of the rotating assembly.

7. The angle measuring apparatus of claim 6, wherein the needle pointer further comprises:

an eye, having an inner circumference such that the protruding outer axle hub of the end cap may be inserted therein, such that the needle pointer eye may rotate about the protruding outer axle hub.

8. The angle measuring apparatus of claim 7, wherein the needle pointer further comprises:

a left pointer and a right pointer connected to an outer circumference of the eye, the left pointer and the right pointer perpendicular to the needle pointer.

9. The angle measuring apparatus of claim 8, wherein the left pointer and the right pointer are aligned with a diameter of the eye, and perpendicular to the needle pointer.

10. The angle measuring apparatus of claim 7, wherein the needle pointer comprises:

a weight, positioned to align the needle pointer with a downward pointing indicator of the indicia.

11. An apparatus comprising:

a housing comprising a circular aperture, and a rectangular slot positioned such that a length of the slot is in parallel with the circular aperture;

a rotatable needle pointer comprising a weighted downward pointing indicator;

a transparent cap, enabling the weighted downward pointing indicator to be visible therethrough;

an end cap, coupled to the rotatable needle pointer and to the transparent cap; and a transparent insert, removably insertable into the rectangular slot, and comprising an indicia operative for a measurement purpose using the rotatable needle pointer to indicate direction of gravity, the indicia visible and superimposed over the weighted downward pointing indicator when the transparent insert is removably inserted into the rectangular slot.

12. The apparatus of claim 11, wherein the transparent insert is rectangular.

13. The apparatus of claim 11, wherein the weighted downward pointing indicator is operative to rotate, maintaining a position with respect to the housing as the housing is moved angularly with respect to a reference position, such that the weighted downward pointing indicator indicates the direction of gravity.

14. The apparatus of claim 11, further comprising:

a plurality of transparent inserts, each transparent insert removably insertable into the rectangular slot, and comprising a unique indicia operative for a different measurement purpose using the rotatable needle pointer, the unique indicia visible and superimposed over the weighted downward pointing indicator when one of the plurality of transparent inserts is removably inserted into the rectangular slot.

15. The apparatus of claim 14, wherein the housing further comprises:

a plurality of storage slots corresponding to the plurality of transparent inserts, each storage slot operative to store a transparent insert removably insertable therein.

16. The apparatus of claim 11, wherein the end cap, comprises a protruding outer axle hub having an inner aperture, operative to have an inner axle hub of the transparent cap inserted to enclose the rotatable needle pointer between the transparent cap and the end cap.

17. The apparatus of claim 16, wherein the rotatable needle point comprises an eye having an inner circumference such that the protruding outer axle hub of the end cap may be inserted therein, such that the rotatable needle pointer eye may rotate about the protruding outer axle hub.

* * * * *